(12) United States Patent
AlSeleten

(10) Patent No.: US 8,099,885 B1
(45) Date of Patent: Jan. 24, 2012

(54) SIMULATED FLOWER DISPLAY

(76) Inventor: Hanaa R. A. A. AlSeleten, Khaitan (KW)

( * ) Notice: Subject to any disclaimer, the term of this patent is extended or adjusted under 35 U.S.C. 154(b) by 0 days.

(21) Appl. No.: 12/826,914

(22) Filed: Jun. 30, 2010

(51) Int. Cl.
*G09F 19/00* (2006.01)

(52) U.S. Cl. .............. 40/406; 40/412; 40/439; 446/166

(58) Field of Classification Search .............. 40/406, 40/412, 427, 439, 477; 446/166
See application file for complete search history.

(56) References Cited

U.S. PATENT DOCUMENTS

| | | | |
|---|---|---|---|
| 1,916,988 A | 7/1933 | Pieschke | |
| 3,471,964 A | 10/1969 | Cherry | |
| 3,665,638 A * | 5/1972 | Weistrop | 446/166 |
| 4,206,565 A | 6/1980 | Goldfarb | |
| 4,973,891 A | 11/1990 | Tzeng | |
| 5,329,714 A * | 7/1994 | Lee | 40/409 |
| 5,946,835 A * | 9/1999 | Boyd | 40/412 |
| 6,527,197 B1 * | 3/2003 | Lin | 239/20 |

* cited by examiner

*Primary Examiner* — Gary Hoge
(74) *Attorney, Agent, or Firm* — Lowe Hauptman Ham & Berner LLP

(57) ABSTRACT

A flower display with hydraulically activated plants includes a front portion that is visible to an observer and a first branch, a first plurality of leaves and a first flower disposed on said first branch within the first plurality of leaves and hidden thereby. The display also includes a second branch, a second plurality of leaves and a second flower disposed on said second branch within the second plurality of leaves and hidden thereby. Hydraulic means are provided for elevating the first plurality of leaves to a first level and the first flower to a second level above the first plurality of leaves.

8 Claims, 3 Drawing Sheets

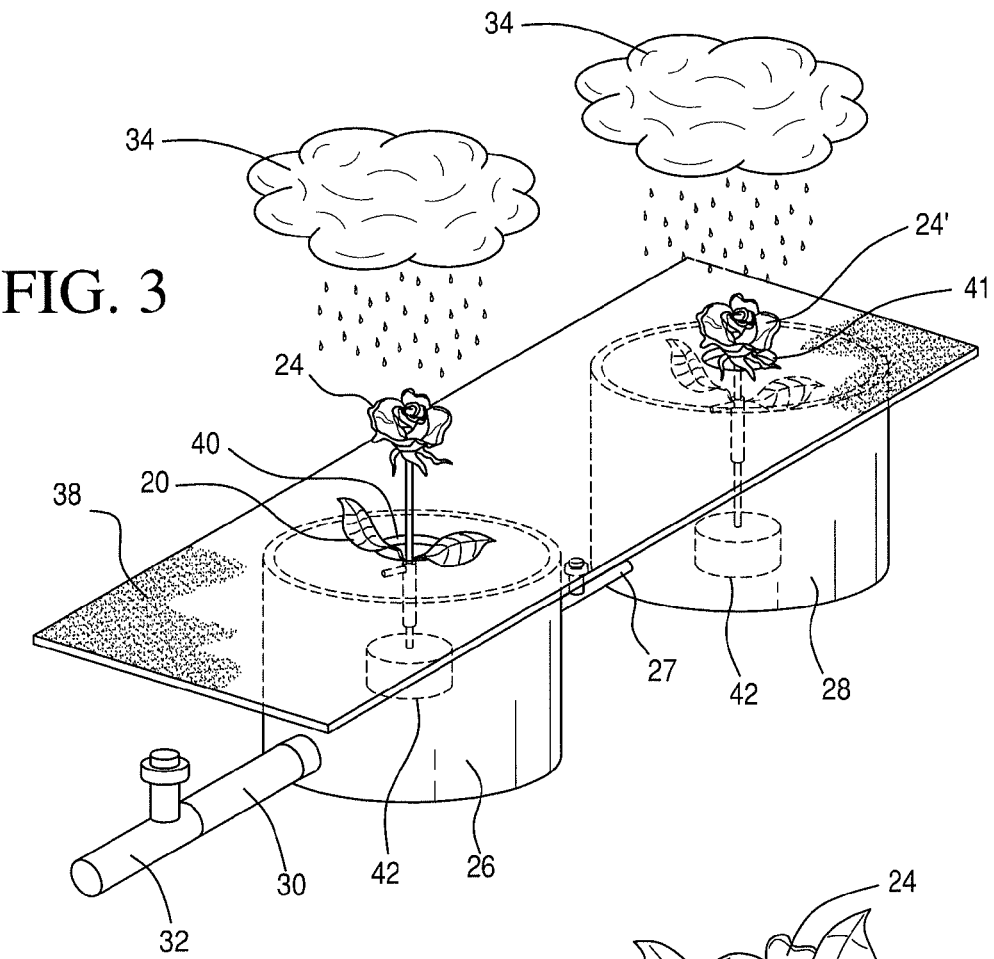
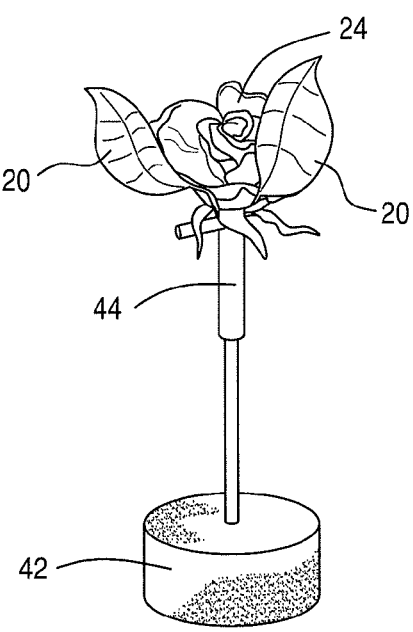
FIG. 3
FIG. 4

SIMULATED FLOWER DISPLAY

FIELD OF THE INVENTION

This invention relates to a simulated flower display and more particularly to a simulated flower display wherein the flower or flowers appear to grow from an appearing bud to a mature flower in response to activation by adding water.

BACKGROUND OF THE INVENTION

Flower displays in which the flower appears to grow out of a container in which they are partially or wholly hidden are well known and have been in use for many years. For example, a U.S. Pat. No. 1,916,988 of Pieschke discloses a display wherein flowers, leaves and other plants appear to grow out of a container.

A more recent display in a U.S. Pat. No. 3,471,964 of N. R. Cherry et al. discloses a simulated animated toy flower which is manufactured from plastic material and includes a bud section, a stem section and a pot or base section. The pot section is formed of a truncated cone and appears to resemble an ordinary flower pot. The stem section is rotatable so that slots in the structure fit in to a stop member. When it is desired to open the bud section it is merely necessary to rotate the stem sections. Then with the stem in its lower most position the petals will be deflected downwardly and outwardly creating the effect of the flower that has blossomed and exposing a central doll.

An artificial flower driving mechanism is also disclosed in a U.S. Pat. No. 4,973,891 of Tzeng. As disclosed, the flowering twig of an artificial flower is exposed by twisting the artificial flower so that the petals of such flower are simultaneously closed and/or opened. A base board is connected with an upper board defining therebetween an enclosure for the mounting therein of a motor and a gear mechanism. A mounting plate is secured to the bottom side of the board for the mounting thereon of a toothed wheel and a pinion wherein the toothed wheel and the pinion are engaged together and driven to rotate by a gear driving mechanism. During operation, the motor drives the gear driving mechanism to carry a flexible tube to twist and simultaneously drive the toothed wheel to rotate permitting a T-post thereon to carry a rigid cord to move up and down so as to simultaneously drive artificial petals to close and open.

Finally, a U.S. patent of Boyd, U.S. Pat. No. 5,946,835 discloses a simulated blooming flower for simulating the blooming of a flower. As disclosed, the flower appears to bloom when water is added. This is accomplished by including a container having a stem therein which defines a reservoir. A sieve has a plurality of drainage apertures. An elongated stem extends from the sieve with the lower end of the stem positioned adjacent to the sieve. A rod is disposed in the stem and a float is disposed in the reservoir and coupled to the lower end of the rod. Coupled to the upper end of the stem is a simulated flower having a plurality of simulated petals which are positionable between a closed position and an open blooming position. A plurality of actuating members are provided within the flower with upper ends of the actuating members positioned adjacent to the petals of the flower and lower ends of the actuating members positioned over the stem. A stamen assembly pushes the actuating members when the stamen assembly is upwardly extended such that the petals of the flower member are moved towards the blooming position.

Notwithstanding the above, it is presently believed that there is a need and a potential commercial market for an improved flower display in accordance with the present invention. There should be a commercial market for such displays because they are actuated hydraulically by simulated rain and appear to grow in response to an addition of water. Further, flowers that may grow at different rates and present a pleasing appearance are provided. Further, it is believed that such displays may be presented in stores, shopping centers and the like and can be manufactured and sold at a reasonable cost. Further, it is believed that displays disclosed herein are durable, can be used repeatedly and are easily activated.

BRIEF SUMMARY OF THE INVENTION

In essence the present invention contemplates a display with hydraulically activated plants and wherein the display includes a front portion that is visible to observers. The display also includes a first branch or stem and a first plurality of leaves as well as a first flower disposed within and hidden by the first plurality of leaves. In the preferred embodiment of the invention a second branch or stem, a second plurality of leaves and a second flower disposed within and hidden by the leaves can be activated to present the display of a bud growing out of the ground and maturing into a blossom. The display includes first hydraulic means for elevating the first plurality of leaves to a first level and the first flower to a second level above the first level of leaves. The display also includes a second hydraulic means for elevating the second plurality of leaves to a first level and the second flower to a second level above the second plurality of leaves. The hydraulic means includes a first pool for confining a first mass of water and a second pool for confining a second mass of water and a cover such as a cork slab extending over the first and second pools. The cover or cork slab also defines a first opening over the first pool and a second opening over the second pool. An image of a cloud and a bottle of water hidden from an observer by the image of the cloud and wherein the water bottle includes a plurality of small openings in an upper portion thereof for producing an appearance of rain when inverted over one of the two pools to thereby raise the level of water in one of the pools.

The first branch includes a float such as a cork float fixed to a lower portion thereof and is disposed in the first pool below a first of the openings with the branch extending upwardly through a first of the openings so that the first flower is raised upwardly above the cover as the water in the first pool rises as a result of water being added to the first pool. The second branch also includes a float fixed to a lower portion thereof and disposed in the second pool below the second opening with the second branch extending upwardly through the opening so that the second branch raises upwardly above the cover when the water in the second pool rises as a result of water being added from the bottle to the second pool. Means for elevating the first plurality of leaves to a first level and the first flower to a second level above the first plurality of leaves includes an outer sleeve slideably moveable with said first branch as it moves upwardly with respect to said cover and includes a first plurality of leaves and an outwardly extending arm for engaging a bottom of the cover to thereby arrest the upward movement of the plurality of leaves while permitting the flower to continue to rise upwardly above the level of the leaves.

The invention will now be described in connection with the accompanying figures wherein like reference numerals have been used to indicate like parts.

DESCRIPTION OF THE DRAWINGS

FIG. 3 is a schematic illustration of a multiple flower display in accordance with the preferred embodiment of the invention; and FIG. 4 is a schematic illustration of a hydraulic mechanism for creating the appearance of a blossoming flower.

Figure 1:
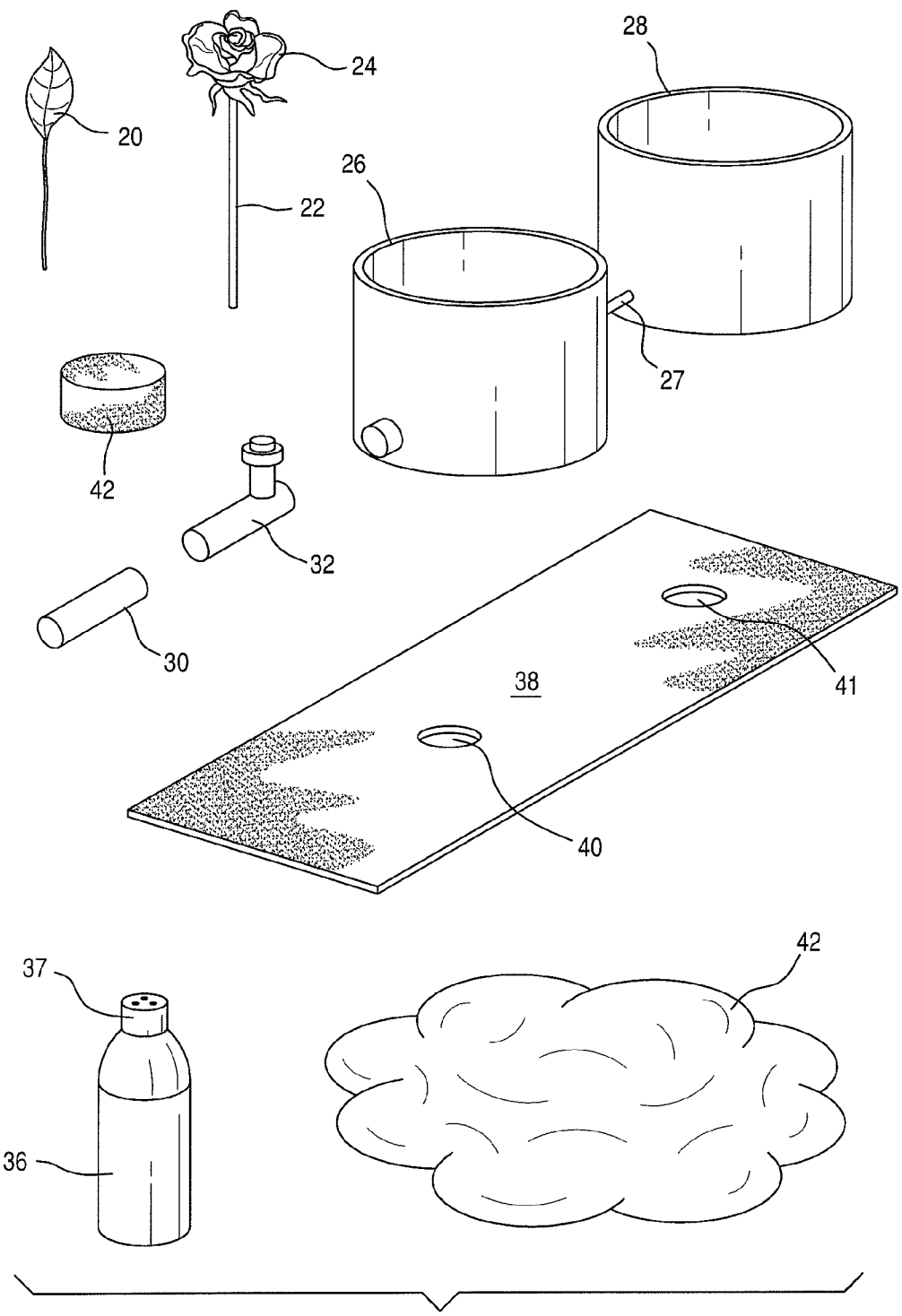
FIG. 1 is a schematic illustration of the components as used in assembling a display in accordance with a first embodiment of the invention.

DESCRIPTION OF THE PREFERRED
EMBODIMENTS OF THE INVENTION

A flower display with hydraulically activated plants in accordance with a preferred embodiment of the invention includes the following components. The display includes a plurality of leaves 20 that are attached to a branch or stem 22 and one or more flowers 24 that are wrapped in and/or hidden by the plurality of leaves 20. The display also includes a first and a second pool or reservoir 27 and 28 that are connected together by a pipe 27. The pools 26 and 28 are also connected to a hydrant 32 by means of a segment of pipe 30 for adding water to the pools 27 and 28. The pipe 27 has a reduced diameter that slows the addition of water to the pool 28 with the result in a delay in the growth of a plant or flower 24' in the pool 28.

An image of a cloud 34 or clouds is disposed in a upper part of the display and is used to hide a bottle of water 36 or two from the view of an observer. The image of the cloud 34 is in the front of the display with the bottle 36 behind the cloud 34. The bottle 36 and image of a cloud 34 are positionable above the pool 26 or pool 28. The bottle has a cap 37 with a plurality of small openings therein and is constructed and arranged to be inverted over the pool 26 or pool 28 to give the appearance of rain falling on a plant in one of the two pools.

A cover 38 such as a cork slab has an opening over each of the pools giving the appearance of a layer of dirt over the plants with the plants growing i.e. moving upward with respect to the cover 38. For example, the cover 38 includes two openings 40 and 41 with one of the openings over each of the pools 26 and 28. A float 42 such as a cork ring is fastened to the bottom of the branch or stem 22 of each flower.

Figure 2A:
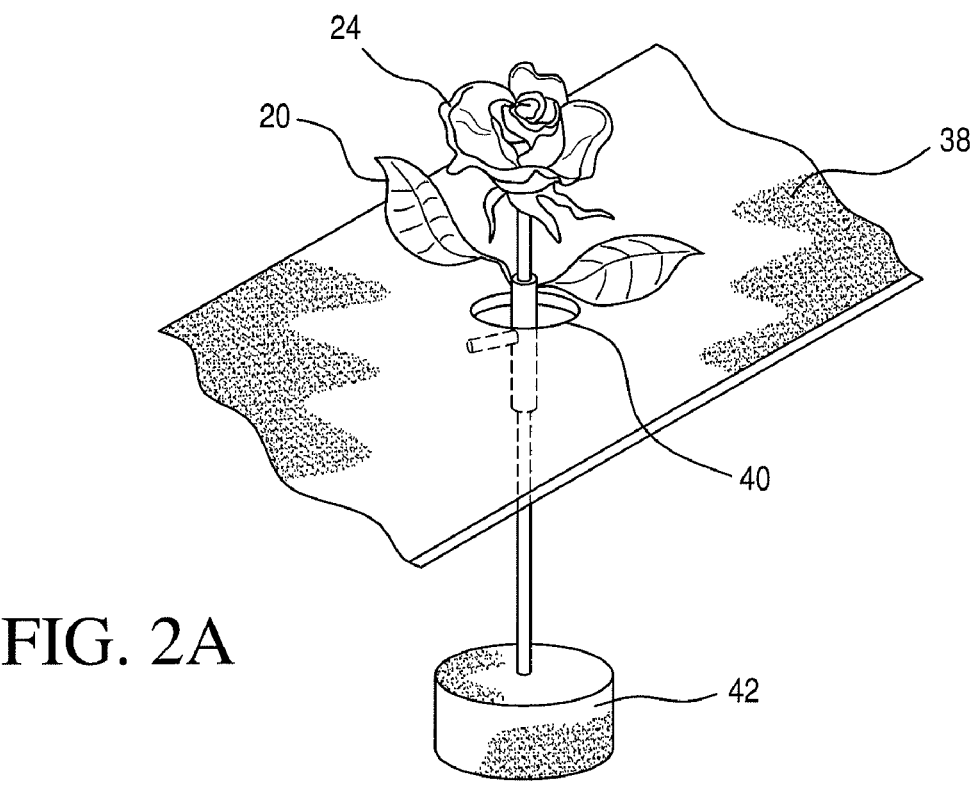
FIG. 2 is a schematic illustration of a partial assembly of a single flower as used in assembling a display in accordance with the invention.
Figure 2B:
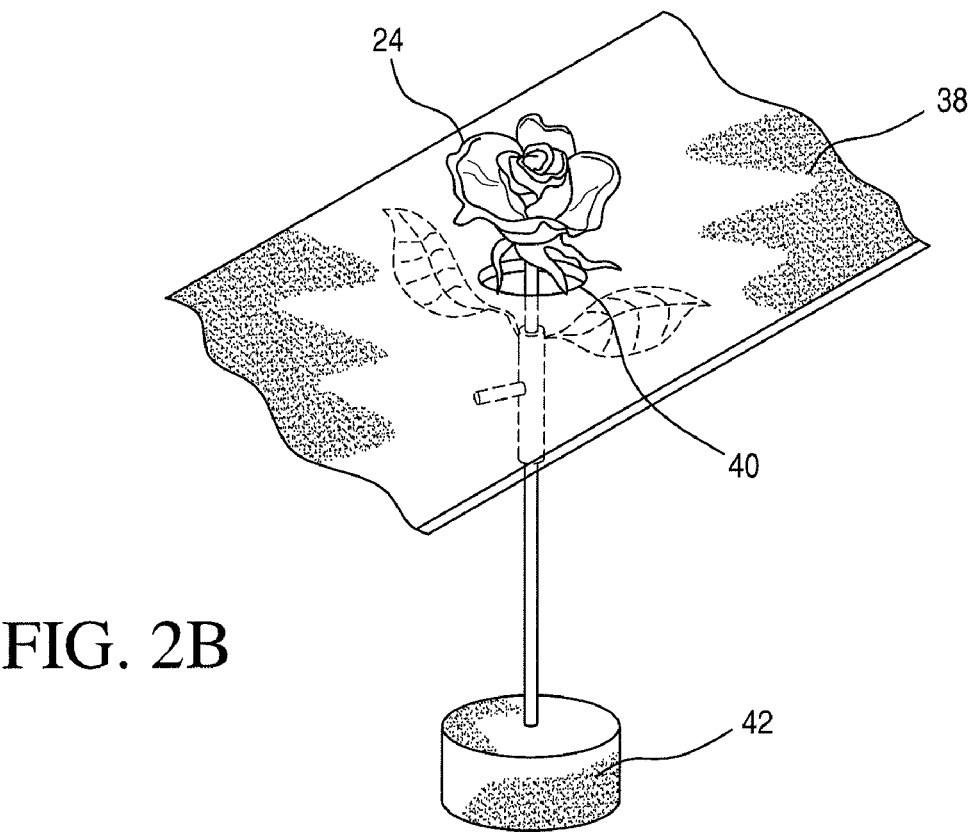

In assembling the invention a flower 24 is wrapped in a plurality of leaves 30 while a float 42 such as a relatively small piece of cork is fixed near the bottom of the branch or stem 22 as shown in FIGS. 2 and 3. The stem 22 is placed in a first pool 26 by passing through the hole 41 with the leaf wrapped flower adjacent to the opening 40 and the cover 38 or cork slab. A second leaf wrapped flower and stem with a cork float is then placed through the second opening 41 and into the second pool 28 with its leaf wrap flower 24' adjacent to the cover 38.

The display is activated by opening the hydrant 32 allowing water to slowly enter the pool 26 or reservoir through the pipe 30. As the pool 26 fills with water the cork float 42 will lift the branch stem 22 upwardly through the hole 40 to give the appearance of a growing flower. The water from pool 26 will also enter pool 28 through a pipe 27 but at a slower rate so that the growth of a second flower 24' will appear to grow at a slower rate.

It is also contemplated to speed up the display's growth by the use of multiple hydrants and/or pipes to deliver more water to the pools 26 and 28.

A mechanism for raising each of the two flowers 24 and 24' out of the pools 26 and 28 will now be described in connection with FIGS. 3 and 4 wherein one of the flowers 24 is disclosed at the end of a branch or stem 22 and originally surrounded by a plurality of leaves 20. Originally the flower 24 is hidden by wrapping the leaves 20 around the flower 24 and placing the assembled flower and leaves through the opening 40 such that the leaves and/or the stem are in the pool 26. The lower end of the stem 22 has a cork float fixed thereto so that the flower moves upwardly in step or stage two out of the opening 40 as the pool 26 is filled with water. As illustrated in FIG. 4 the plurality of leaves 20 are fixed to an outer sleeve 44 that is slidingly fit over the stem 22 so that the leaves 20 move upwardly with the raising of the flower.

However, in step or stage three as the flower 24 rises upwardly and appears to grow the outer sleeve 44 includes an outwardly extending arm that engages the bottom of the cover 38. This arm upon engagement with the bottom of the cover 38 prevents the plurality of leaves from rising above a first level. Then, as the water in the pool 26 continues to rise in step or stage three the flower 24 is on the top of stem 22 will continue to rise upwardly and outwardly from the plurality of leaves 20 to a second level above the plurality of leaves and opens in stage four. A second flower 24' will then follow in a similar manner as it appears to move upwardly from the second pool 28, rises above the leaves and opens.

While the invention has been described in connection with its preferred embodiments it should be recognized that changes and modifications may be made therein without departing from the scope of the appended claims.

What is claimed is:

1. A flower display with hydraulically activated plants, said display comprising:
    a front portion visible to an observer;
    a first branch, a first plurality of leaves and a first flower disposed within said first plurality of leaves and hidden thereby;
    a second branch, a second plurality of leaves and a second flower disposed within said second plurality of leaves and hidden from an observer thereby;
    hydraulic means for elevating said first plurality of leaves to a first level and said first flower to a second level above said first plurality of leaves;
    second hydraulic means for elevating said second plurality of leaves to a first level and said second flower to a second level above said first plurality of leaves;
    said hydraulic means including a first pool for confining a fluid mass of water and a second pool for confining a second mass of water and a cover covering said first and second pools and defining a first opening over said first pool and a second opening over said second pool;
    an image of a cloud and a bottle of water hidden from an observer by said image of said cloud and defining a plurality of small openings in a upper portion thereof for producing an appearance of rain when inverted over one of said pools to thereby raise the level of water in said one of said pools;
    said first branch including a float fixed to a lower portion thereof and disposed in said first of said pools below a first of said openings with said branch extending upwardly and partially through a first of said openings so that said first flow of water raises said branch upwardly above said cover as the water in said first pool rises as a result of water being added to said first pool;
    said second branch including a float fixed to a lower portion thereof and disposed in said second of said pools below a said second opening with said second branch extending upwardly partially through said second opening so that said second branch raises upwardly above said cover as the water in said second pool rises as a result of water being added from said bottle to said second pool; and in which said hydraulic means for elevating said first plurality of leaves to a first level and said first flower to a second level above said first plurality of leaves includes an outer sleeve mounted on said first branch and moveable upwardly with respect to said cover and including said first plurality of leaves and including an outwardly extending arm engaging the bottom of said cover to thereby arrest the upper movement of said plurality of leaves while permitting said branch to continue to elevate said flower above the level of said leaves.

2. A flower display according to claim 1 in which said cover over said pools is cork.

3. A flower display according to claim 2 in which said floats are cork.

4. A flower display with hydraulically activated plants according to claim 3 wherein said first and second pools are connected together by a pipe line.

5. A flower display with hydraulically activated plants according to claim 4 wherein said pipe line connecting said pools has a relatively small diameter so that said second flower opening is delayed until after the opening of said first flower.

6. A flower display with hydraulically activated plants according to claim 4 which includes two hydrants and two pipe lines to expedite the apparent growth of said flowers.

7. A flower display with hydraulically activated plants according to claim 5 in which said hydraulic means for elevating said first plurality of leaves to a first level and said first flower to a second level above said first plurality of leaves includes an outer sleeve moveable with said first branch as it moves upwardly with respect to said cover and including said first plurality of leaves and including an outwardly extending arm for engaging a bottom of said cover to thereby arrest the upward movement of said first plurality of leaves while permitting said first flower to continue to move upwardly above the level of said leaves and in which elevating said second plurality of leaves includes an outer sleeve moveable with said second branch as it moves upwardly with respect to said cover and includes an outwardly extending arm for engaging a bottom of said cover to thereby arrest the upward movement of said second plurality of leaves while permitting said second flower to continue to move upwardly to a second level.

8. A flower display with hydraulically activated plants, said display consisting of:
- a front portion visible to an observer;
- a first branch, a first plurality of leaves and a first flower disposed within and hidden by said first plurality of leaves;
- a second branch, a second plurality of leaves and a second flower disposed within said second plurality of leaves and hidden thereby;
- first hydraulic means for elevating said first plurality of leaves to a first level and said first flower to a second level above said first plurality of leaves;
- second hydraulic means for elevating said second plurality of leaves to a first level and second flower to a level above said second plurality of leaves; and
- said first and second hydraulic means including a first pool for confining a mass of water and a second pool for confining a second mass of water and a slab of cork covering said first and second pools and defining a first opening over said first pool and a second opening over said second pool;
- an image of a cloud and a bottle of water hidden from an observer by said image of a cloud and defining a plurality of small openings in an upper portion of said bottle for producing an appearance of rain when said bottle is inverted over one of said pools to thereby raise the water in said one of said pools;
- said first branch including a cork float fixed to a lower portion thereof and disposed in said first pool below a first of said openings with said first branch extending upwardly and partially through a first of said openings so that said first flower is raised above said first plurality of leaves as a result of a raising water level in said pool; and
- said second branch including a cork float fixed to a lower portion thereof and disposed in said second pool below said second opening with said second branch extending upwardly and partially through said second opening so that second branch raises upwardly above said cork slab as the water in said second pool rises as a result of water being added to said second pool, and
- in which said hydraulic means for elevating said first plurality of leaves to a first level and said first flower to a second level above said first plurality of leaves includes an outer sleeve moveable with said first branch as it moves upwardly with respect to said cover and including said first plurality of leaves and including an outwardly extending arm for engaging a bottom of said cover to thereby arrest the upward movement of said first plurality of leaves while permitting said first flower to continue to move upwardly above the level of said leaves and in which elevating said second plurality of leaves includes an outer sleeve moveable with said second branch as it moves upwardly with respect to said cover and includes an outwardly extending arm for engaging a bottom of said cover to thereby arrest the upward movement of said second plurality of leaves while permitting said second flower to continue to move upwardly to a second level.

* * * * *